(12) United States Patent
Itoh

(10) Patent No.: US 6,970,298 B1
(45) Date of Patent: Nov. 29, 2005

(54) ZOOM LENS SYSTEM AND IMAGE CAPTURE APPARATUS HAVING THE SAME

(75) Inventor: Yoshinori Itoh, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/123,937

(22) Filed: May 6, 2005

(30) Foreign Application Priority Data

May 7, 2004 (JP) .............................. 2004-139048

(51) Int. Cl.$^7$ ............................................ G02B 15/14
(52) U.S. Cl. ................. 359/680; 359/682; 359/684; 359/740; 359/771; 359/686; 359/715; 359/783
(58) Field of Search ................. 359/676, 680–682, 359/684, 740, 771, 686, 715, 783

(56) References Cited

U.S. PATENT DOCUMENTS

| | | | |
|---|---|---|---|
| 4,477,153 A | 10/1984 | Suda | 359/680 |
| 4,662,723 A | 5/1987 | Imai | 359/680 |
| 4,687,302 A | 8/1987 | Ikemori | 359/686 |
| 4,733,952 A | 3/1988 | Fujioka | 359/681 |
| 5,321,553 A | 6/1994 | Ishiyama | 359/684 |
| 5,434,710 A | 7/1995 | Zozawa | 359/689 |
| 5,715,097 A | 2/1998 | Shibayama | 359/684 |
| 5,721,642 A | 2/1998 | Shibayama | 359/686 |
| 5,847,875 A | 12/1998 | Kodama | 359/684 |
| 5,872,660 A | 2/1999 | Kohno | 359/689 |
| 5,969,878 A | 10/1999 | Koizumi | 359/682 |
| 6,038,084 A | 3/2000 | Okada | 359/689 |
| 6,169,635 B1 | 1/2001 | Ozaki | 359/691 |
| 6,304,389 B1 | 10/2001 | Shibayama | 359/689 |
| 6,888,683 B2 * | 5/2005 | Itoh | 359/686 |

FOREIGN PATENT DOCUMENTS

| | | |
|---|---|---|
| JP | 60-31110 A | 2/1985 |
| JP | 60-150019 A | 8/1985 |
| JP | 61-221719 A | 2/1986 |
| JP | 2-118509 A | 5/1990 |
| JP | 10-213745 A | 8/1998 |
| JP | 2001-42218 A | 2/2001 |
| JP | 2001-100098 A | 4/2001 |

* cited by examiner

Primary Examiner—Evelyn A. Lester
(74) Attorney, Agent, or Firm—Canon USA, Inc

(57) ABSTRACT

A zoom lens system has four lens units, i.e., in order from an object side to an image side, a first lens unit of negative optical power, a second lens unit of positive optical power, a third lens unit of positive optical power, and a fourth lens unit of positive optical power. During zooming from a wide-angle end to a telephoto end, a space between the first lens unit and the second lens unit decreases, a space between the second lens unit and the third lens unit varies, and a space between the third lens unit and the fourth lens unit increases. Two negative lens elements constituting the first lens unit are made from high refractive index materials. Accordingly, a small-sized zoom lens system capable of obtaining a desired wide angle of field at the wide-angle end, a desired zoom ratio and high optical performance with a minimum number of lens elements can be provided.

8 Claims, 7 Drawing Sheets

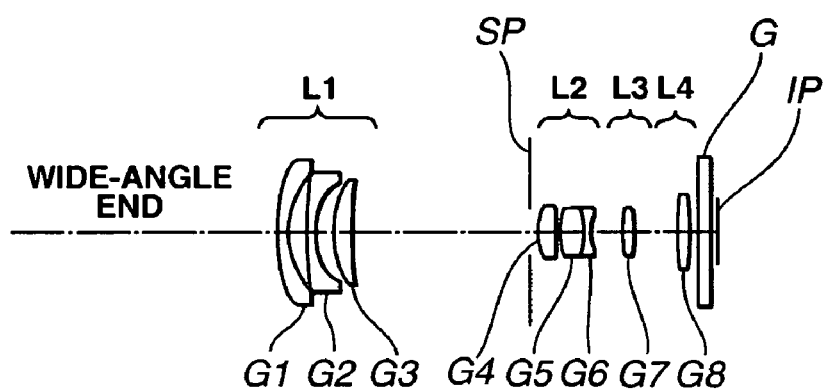
FIG.1A WIDE-ANGLE END
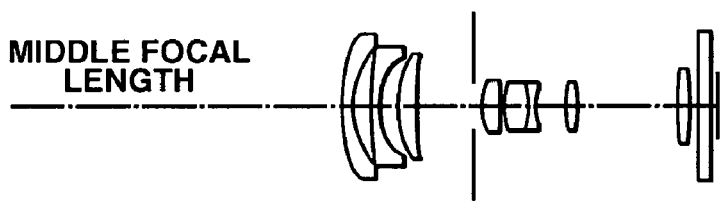
FIG.1B MIDDLE FOCAL LENGTH
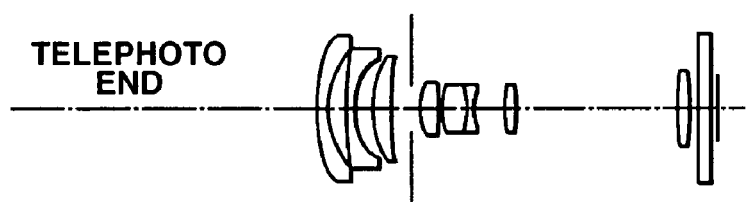
FIG.1C TELEPHOTO END

WIDE-ANGLE END

MIDDLE FOCAL LENGTH

TELEPHOTO END

WIDE-ANGLE END

MIDDLE FOCAL LENGTH

TELEPHOTO END

ZOOM LENS SYSTEM AND IMAGE CAPTURE APPARATUS HAVING THE SAME

BACKGROUND OF THE INVENTION

1. Field of the Invention

The present invention relates to zoom lens systems which are suitable, for example, for use as a photographing optical system for digital still cameras.

2. Description of the Related Art

Digital still cameras for capturing still images using a solid-state image sensor, such as a CCD (charge-coupled device) sensor or a CMOS (complementary metal oxide semiconductor) sensor, have received attention in recent years. It is desirable to have such digital still cameras small and compact in size. Accordingly, it is desirable for a photographing optical system serving as one of the units of a digital still camera to be very short in total length.

In addition, it is desirable for the photographing optical system to have a wide angle of field in consideration of capturing still images. Moreover, it is desirable for the photographing optical system to provide high optical performance since the digital still camera uses a solid-state image sensor having a greater number of pixels than that of a video camera designed to capture moving images.

Many types of fast zoom lenses having a wide angle of field and providing high optical performance while having a relatively low zoom magnification of 2.5× through 3× or thereabout have been proposed. For example, Japanese Patent Publication No. 6-66008 (corresponding to U.S. Pat. No. 4,662,723) discloses a zoom lens having two lens units of negative and positive refractive powers, respectively, in order from the object side to the image side. Zooming is effected by varying the space between the two lens units.

Japanese Patent Publication No. 7-52256 (corresponding to U.S. Pat. No. 4,733,952) discloses a zoom lens having three lens units of negative, positive and positive refractive powers, respectively, in order from the object side to the image side. The space between the second lens unit and the third lens unit increases during zooming from the wide-angle end to the telephoto end.

U.S. Pat. No. 5,434,710 discloses a zoom lens having three lens units of negative, positive and positive refractive powers, respectively, in order from the object side to the image side. The space between the second lens unit and the third lens unit decreases during zooming from the wide-angle end to the telephoto end.

Japanese Laid-open Patent Application No. 60-31110 discloses a zoom lens having four lens units of negative, positive, positive and positive refractive powers, respectively, in order from the object side to the image side. The space between the second lens unit and the third lens unit decreases during zooming from the wide-angle end to the telephoto end, and the fourth lens unit is stationary during zooming.

U.S. Pat. Nos. 4,477,153, 5,321,553, 5,715,097, 5,721,642, 5,847,875, 5,872,660, 5,969,878, 6,038,084 and 6,169,635 and Japanese Laid-Open Patent Application Nos. 2-118509, 10-213745 and 2001-100098 disclose a zoom lens having three lens units of negative, positive and positive refractive powers, respectively, in order from the object side to the image side. The first lens unit includes three or more lens elements and has one or more aspheric surfaces.

Japanese Laid-Open Patent Application No. 2001-42218 (corresponding to U.S. Pat. No. 6,304,389) discloses a zoom lens having an angle of field of 70° or more at the wide-angle end and a zoom ratio of about 3.6.

However, the zoom lens disclosed in Japanese Patent Publication No. 6-66008 has a great number of lens elements and is, therefore, disadvantageous in terms of compactness. In addition, the position of en exit pupil varies to a great extent during zooming. Therefore, although the zoom lens can be used as a photographing optical system of a silver-halide film camera without problems, the size of the zoom lens tends to increase because design limitations are imposed on power arrangement when the zoom lens is used as a photographing optical system of a digital still camera or the like using a solid-state image sensor.

In the zoom lens disclosed in Japanese Patent Publication No. 7-52256, the position of en exit pupil varies to a great extent during zooming, as in the zoom lens disclosed in Japanese Patent Publication No. 6-66008.

The zoom lenses disclosed in U.S. Pat. No. 5,434,710 and Japanese Laid-open Patent Application No. 60-31110 have a great number of lens elements and, therefore, have limitations on compactness.

The zoom lenses disclosed in U.S. Pat. Nos. 4,477,153, 5,321,553, 5,715,097, 5,721,642, 5,847,875, 5,872,660, 5,969,878, 6,038,084 and 6,169,635 and Japanese Laid-Open Patent Application Nos. 2-118509, 10-213745 and 2001-100098 are insufficient to attain a reduction in size while securing an angle of field at the wide angle end and a zoom ratio that are greater than respective predetermined values.

In the zoom lens disclosed in Japanese Laid-Open Patent Application No. 2001-42218, it is necessary for the second lens unit to have a great number of lens elements so as to perform aberration correction. Therefore, sufficient reduction in size of the whole lens system cannot be attained.

SUMMARY OF THE INVENTION

The present invention is directed to a small-sized zoom lens system capable of obtaining a desired wide angle of field at the wide-angle end, a desired zoom ratio and high optical performance with a minimum number of lens elements.

In one aspect of the present invention, a zoom lens system consists of, in order from an object side to an image side, a first lens unit of negative optical power (reciprocal of the focal length), a second lens unit of positive optical power, a third lens unit of positive optical power, and a fourth lens unit of positive optical power. In the zoom lens system, during zooming from a wide-angle end to a telephoto end, a space between the first lens unit and the second lens unit decreases, a space between the second lens unit and the third lens unit varies, and a space between the third lens unit and the fourth lens unit increases. The first lens unit consists of, in order from the object side to the image side, a first lens element of negative optical power having an aspheric surface, a second lens element of negative optical power having a meniscus shape with a convex surface facing the object side, and a third lens element of positive optical power. The second lens unit consists of, in order from the object side to the image side, a fourth lens element of positive optical power, a fifth lens element of positive optical power, and a sixth lens element of negative optical power. The third lens unit consists of a seventh lens element of positive optical power. The fourth lens unit consists of an eighth lens element of positive optical power. The zoom lens system satisfies the following conditions:

$$1.85 < (n11+n12)/2 < 1.95$$

$$1.5 < f11/f12 < 2.5$$

where n11 is a refractive index of material of the first lens element, n12 is a refractive index of material of the second lens element, f11 is the focal length of the first lens element, and f12 is the focal length of the second lens element.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A, 1B and 1C are sectional views of a zoom lens according to a first embodiment of the invention.

DETAILED DESCRIPTION OF THE EMBODIMENTS

Embodiments of the invention will be described in detail below with reference to the drawings.

Figure 2A:
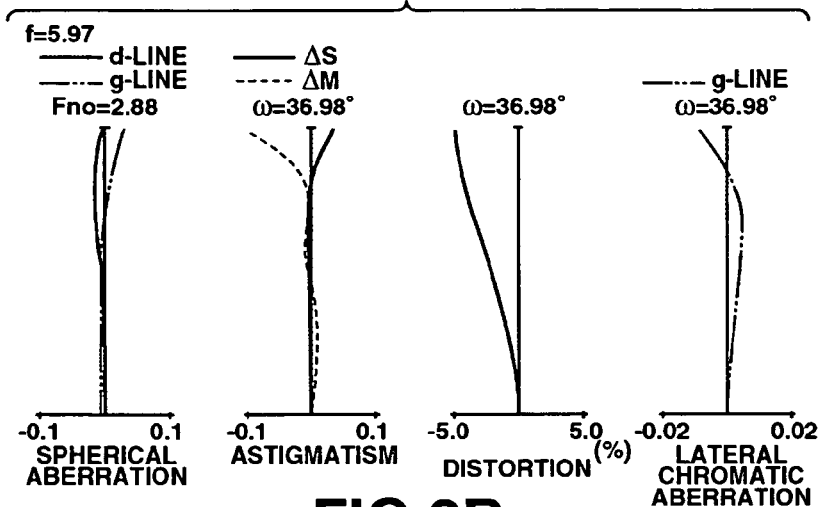
FIGS. 2A, 2B and 2c are graphical representations of the aberrations of the zoom lens according to the first embodiment.
Figure 2B:
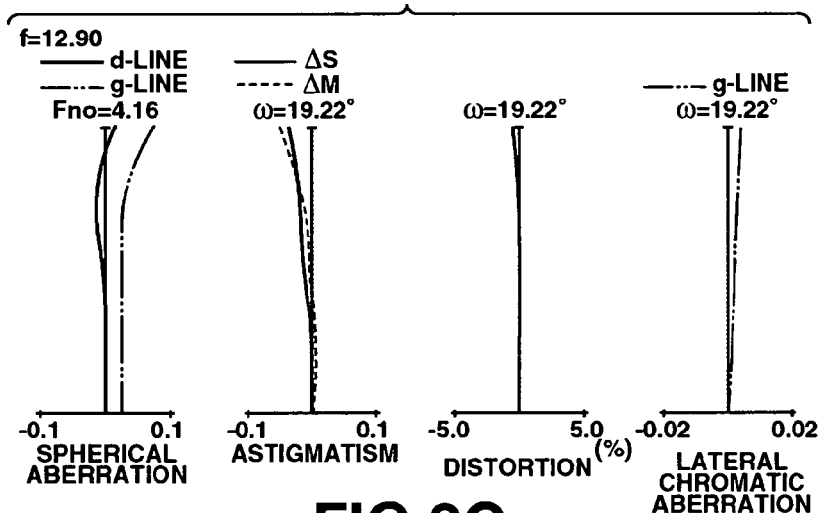
Figure 2C:
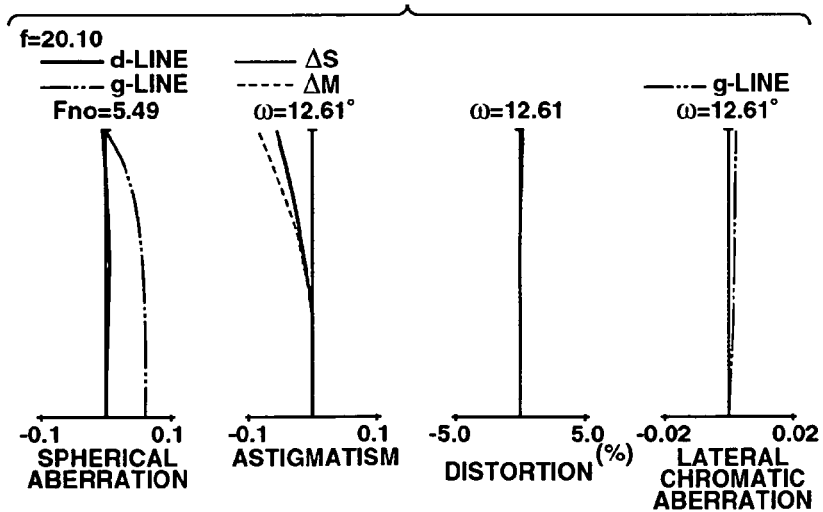
Figure 3A:
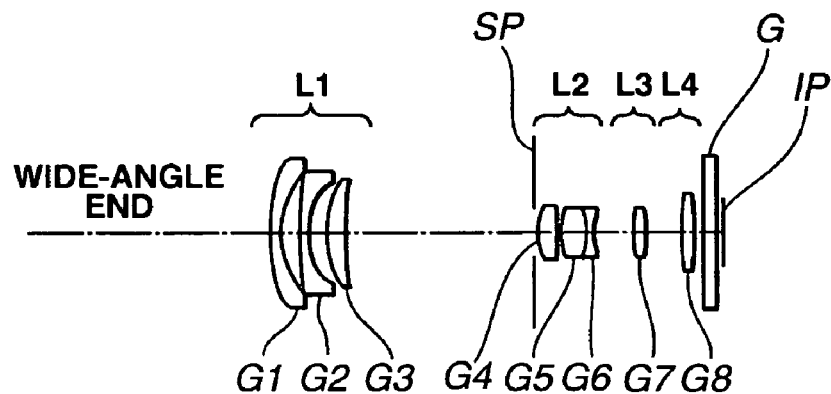
FIGS. 3A, 3B and 3C are sectional views of a zoom lens according to a second embodiment of the invention.
Figure 3B:
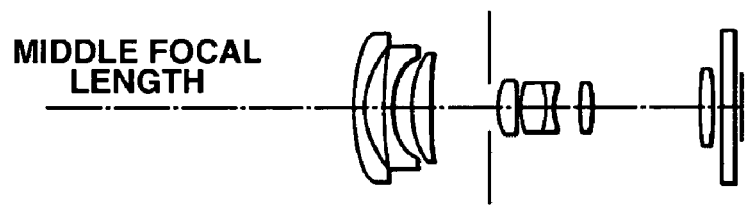
Figure 3C:
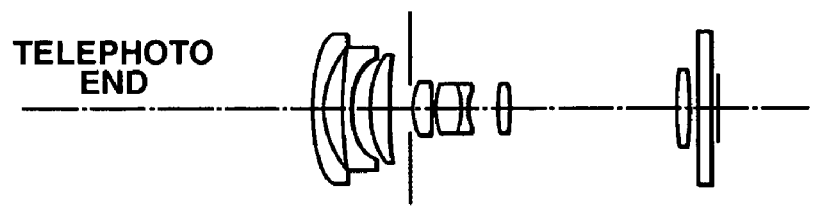
Figure 4A:
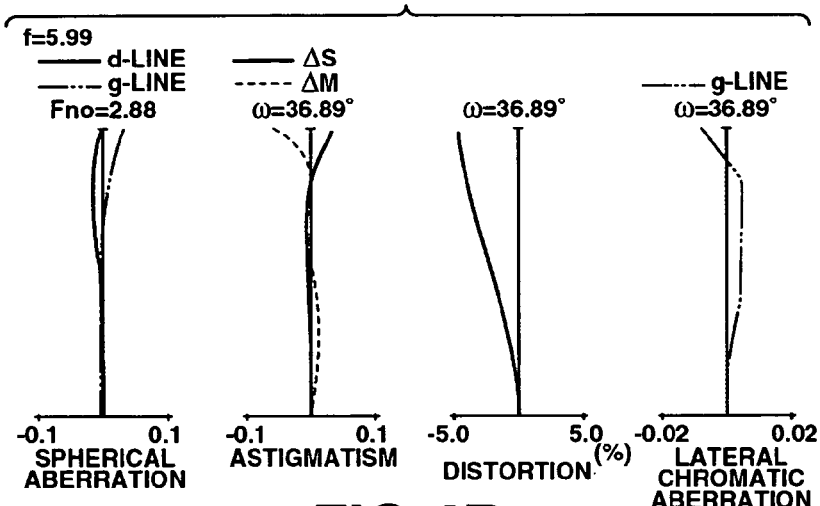
FIGS. 4A, 4B and 4c are graphical representations of the aberrations of the zoom lens according to the second embodiment.
Figure 4B:
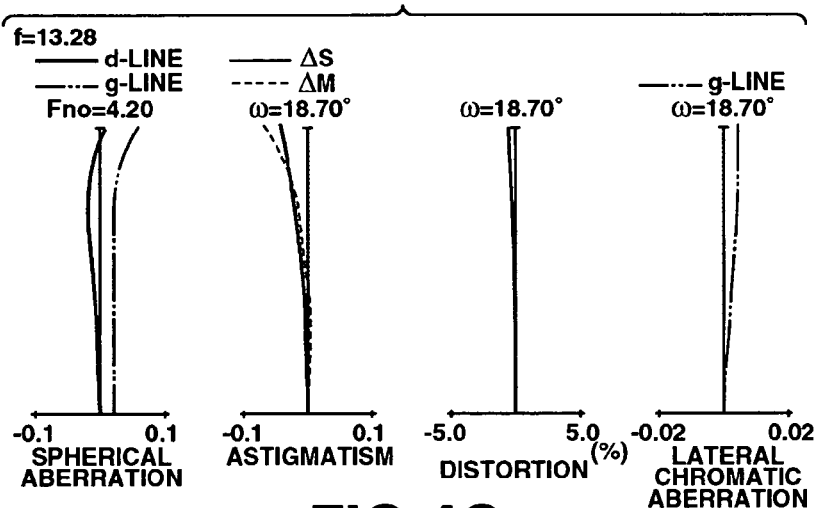
Figure 4C:
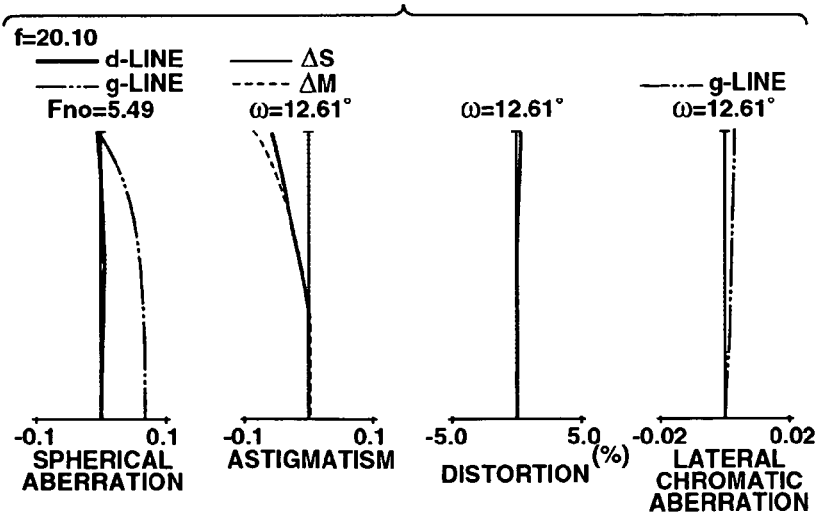
Figure 5A:
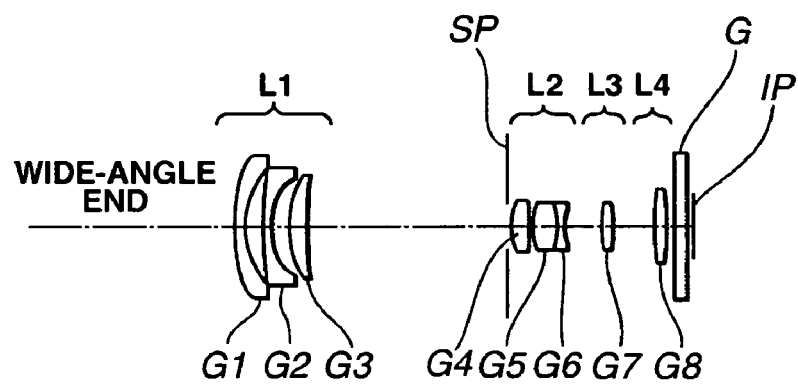
FIGS. 5A, 5B and 5C are sectional views of a zoom lens according to a third embodiment of the invention.
Figure 5B:
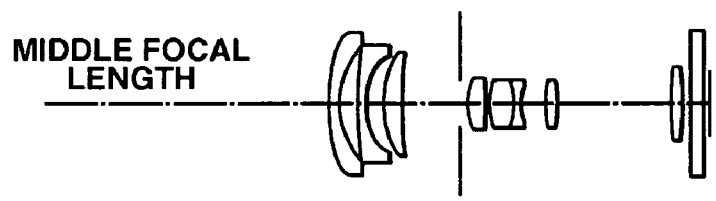
Figure 5C:
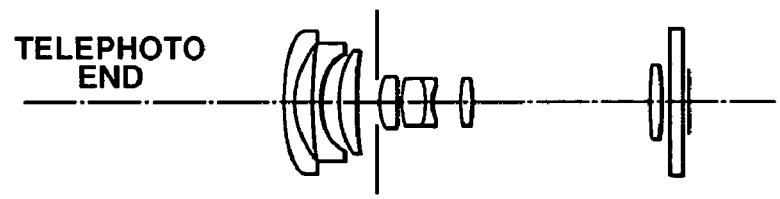
Figure 6A:
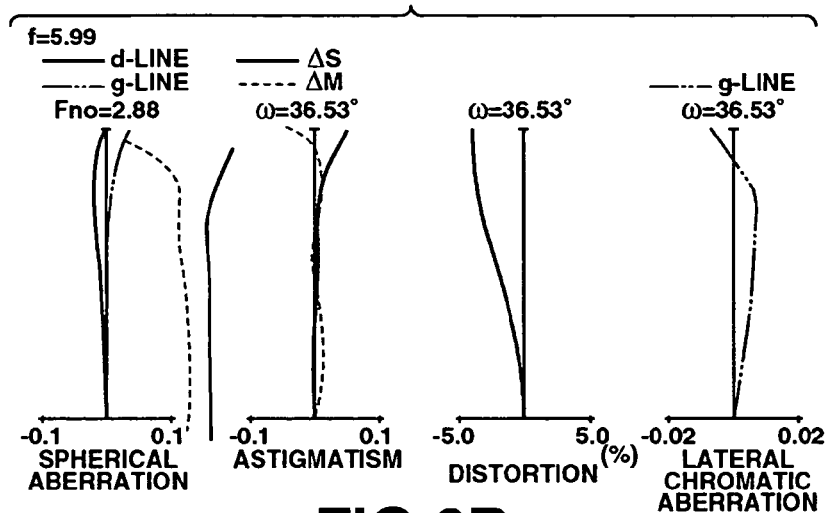
FIGS. 6A, 6B and 6c are graphical representations of the aberrations of the zoom lens according to the third embodiment.
Figure 6B:
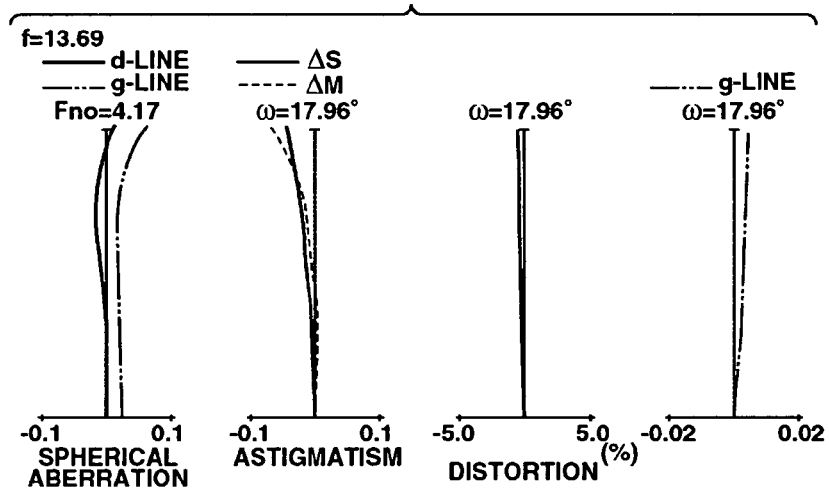
Figure 6C:
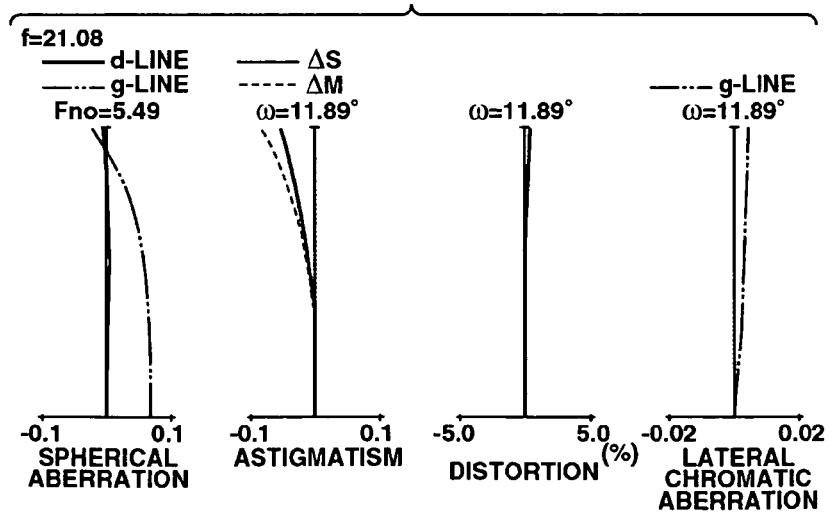

FIGS. 1A to 1C, 3A to 3C and 5A to 5C are sectional views of zoom lenses according to first to third embodiments of the invention, respectively, in the various zoom positions. The zoom lenses according to the first to third embodiments can be used as a photographing optical system for a video camera or digital still camera. FIGS. 2A to 2C, 4A to 4C and 6A to 6C are graphical representations of the aberrations of the zoom lenses according to the first to third embodiments of the invention, respectively. FIGS. 2A, 4A and 6A represent the aberrations when the zoom lens is operating at the wide-angle end. FIGS. 2B, 4B and 6B represent the aberrations when the zoom lens is operating at the middle focal length position. FIGS. 2C, 4C and 6C represent the aberrations when the zoom lens is operating at the telephoto end.

In each sectional view of the zoom lens, the object side (front side) is located to the left, and the image side (rear side) is located to the right. The zoom lens includes a first lens unit L1 of negative refractive power (optical power= reciprocal of the focal length), a second lens unit L2 of positive refractive power, a third lens unit L3 of positive refractive power, and a fourth lens unit L4 of positive refractive power. An aperture stop SP is located between the first lens unit L1 and the second lens unit L2. A glass block G is located behind the fourth lens unit L4. The glass block G is designed to correspond to a parallel flat plate located in an optical path. The glass block can be, for example, an optical low-pass filter, an infrared cut filter, a cover glass or the like. An image plane IP corresponds to a photosensitive surface of a solid-state image sensor, such as a CCD sensor or a CMOS sensor.

In each graphical representation of the aberrations, the aberrations are represented with a d-line, a g-line, a meridional image surface ΔM and a sagittal image surface ΔS. Lateral chromatic aberration is represented with the g-line.

In the zoom lens according to each of the first to third embodiments, when the zoom lens zooms from the wide-angle end to the telephoto end, the first lens unit L1 moves toward the image side during zooming from the wide-angle end to the middle focal length position and moves toward the object side during zooming from the middle focal length position to the telephoto end. Thus, the first lens unit L1 moves in such a way as to have a part of a locus that is convex toward the image side. Both the second lens unit L2 and the third lens unit L3 move toward the object side while varying the space therebetween. The fourth lens unit L4 does not move for zooming.

As a result of zooming, the space between the first lens unit L1 and the second lens unit L2 is narrower when the zoom lens is at the telephoto end than at the wide-angle end. The space between the third lens unit L3 and the fourth lens unit L4 is wider when the zoom lens is at the telephoto end than at the wide-angle end.

The aperture stop SP is located between the first lens unit L1 and the second lens unit L2. The aperture stop SP moves integrally with the second lens unit L2 during zooming, thus simplifying mechanical mounting of the zoom lens.

Focusing from an infinitely distant object to a close object is effected by moving the third lens unit towards the object side.

The first lens unit L1 has, in order from the object side to the image side, a first lens element G1 of negative refractive power, a second lens element G2 of negative refractive power, and a third lens element G3 of positive refractive power. The first lens element G1 has an aspheric surface facing the image side and shaped so that a negative refractive power becomes progressively weaker from the center of the aspheric surface to the periphery. The first lens element G1 has a meniscus shape with a convex surface facing the object side. The second lens element G2 also has a meniscus shape with a convex surface facing the object side. The third lens element G3 also has a meniscus shape with a convex surface facing the object side.

The second lens unit L2 has, in order from the object side to the image side, a fourth lens element G4 of positive refractive power, and a cemented lens composed of a fifth lens element G5 of positive refractive power and a sixth lens element G6 of negative refractive power. The fifth lens element G5 has an aspheric surface facing the object side.

The third lens unit L3 has a seventh lens element G7 of positive refractive power. The seventh lens element G7 can be a single biconvex lens.

The fourth lens unit L4 has an eighth lens element G8 of positive refractive power. The eighth lens element G8 also can be a single biconvex lens.

The zoom lenses according to the first to third embodiments satisfy the following conditions:

$$1.85 < (n11+n12)/2 < 1.95 \tag{1}$$

$$1.5 < f11/f12 < 2.5 \tag{2}$$

where n11 is a refractive index of material of the first lens element G1, n12 is a refractive index of material of the second lens element G2, f11 is the focal length of the first lens element G1, and f12 is the focal length of the second lens element G2.

The condition (1) is concerned with the mean value of refractive indices of materials of two negative lens elements constituting the first lens unit L1. If the upper limit of the condition (1) is exceeded, cost for manufacturing lenses increases, and only glass materials of high dispersion can be used, so that lateral chromatic aberration becomes large at the wide-angel end. If the lower limit of the condition (1) is exceeded, the Petzval sum tends to increase in the negative direction, so that it is necessary to weaken the refractive power of the first lens unit L1. As a result, the total length of the zoom lens at the wide-angle end and the diameter of the frontmost lens element disadvantageously increases.

The condition (2) is concerned with the ratio between the focal lengths of two negative lenses constituting the first lens unit L1. If the focal length of the second lens element G2 becomes too short beyond the upper limit of the condition (2), coma flare at the peripheral portion of an image disadvantageously increases when the zoom lens is at the wide-angel end. If the focal length of the first lens element G1 becomes too short beyond the lower limit of the condition (2), it becomes difficult to correct for distortions when the zoom lens is at the wide-angle end.

The upper and lower limits of the conditions (1) and (2) can be altered as follows:

$$1.86 < (n11+n12)/2 < 1.89 \tag{1a}$$

$$1.8 < f11/f12 < 2.2 \tag{2a}$$

In addition, the zoom lens satisfies the following conditions:

$$66 < vd3 < 78 \tag{3}$$

$$-0.4 < (R31+R32)/(R31-R32) < 0.2 \tag{4}$$

where vd3 is the Abbe number of material of the seventh lens element G7 constituting the third lens unit L3, R31 is the radius of curvature of a surface facing the object side of the seventh lens element G7, and R32 is the radius of curvature of a surface facing the image side of the seventh lens element G7.

The condition (3) is concerned with the Abbe number of material of the seventh lens element G7 constituting the third lens unit L3. If the Abbe number becomes too large beyond the upper limit of the condition (3), it would be difficult to manufacture the seventh lens element G7, thus disadvantageously increasing cost for glass material. If the Abbe number becomes too small beyond the lower limit of the condition (3), variation of chromatic aberration caused by focusing disadvantageously increases.

The upper and lower limits of the conditions (3) and (4) can be altered as follows:

$$69 < vd3 < 73 \tag{3a}$$

$$-0.3 < (R31+R32)/(R31-R32) < 0.1 \tag{4a}$$

In addition, the zoom lens satisfies the following condition:

$$-0.6 < (R41+R42)/(R41-R42) < 0 \tag{5}$$

where R41 is the radius of curvature of a surface facing the object side of the eighth lens element G8 constituting the fourth lens unit L4, and R42 is the radius of curvature of a surface facing the image side of the eighth lens element G8.

The condition (5) is concerned with a shape factor of the eighth lens element G8 constituting the fourth lens unit L4. If the upper or lower limit of the condition (5) is exceeded, it becomes difficult to adequately correct both distortion and curvature of field.

The upper and lower limits of the condition (5) can be altered as follows:

$$-0.4 < (R41+R42)/(R41-R42) < -0.2 \tag{5a}$$

In the zoom lens according to each of the first to third embodiments, in order to simultaneously achieve a wide angle of field, a high zoom ratio and high optical performance, the first lens unit L1 is composed of three lens elements, which may be more than a conventional zoom lens. However, two negative lenses constituting the first lens unit L1 are made from glass materials of high refractive indices. Therefore, each of the third lens unit L3 and the fourth lens unit L4 can be composed of a single lens element. Accordingly, the number of lens elements constituting the whole zoom lens can be made minimal.

In particular, although being composed of a single lens element, the third lens unit L3 is made from a glass material of low dispersion, thereby reducing variation of chromatic aberration caused by focusing.

The four-unit type zoom lens of the negative, positive, positive and positive power arrangement includes (3+3+1+1) lens elements, i.e., eight lens elements in total, so as to attain a fast zoom lens having a wide angle of field, a zoom ratio of about 3 through 4 and high optical performance with a minimal number of lens elements. If the number of lens elements of each lens unit is smaller than the above-described number, sufficient optical performance cannot be obtained in the desired specifications of the zoom lens. If the number of lens elements of each lens unit is larger than the above-described number, the total length of the zoom lens when being retracted increases.

In cases in which the third lens unit L3 and the fourth lens unit L4 are composed of a single lens element, the Petzval sum of the entire zoom lens tends to increase in the negative direction as compared with cases in which the third lens unit L3 and the fourth lens unit L4 are composed of a plurality of lens elements including a negative lens element. In the zoom lens according to the first to third embodiments of the invention, while the third lens unit L3 and the fourth lens unit L4 are composed of a single lens element, in order to maintain the balance of an image plane of the entire zoom lens, two negative lens elements constituting the first lens unit L1 are made from glass materials of high refractive indices, thus preventing the occurrence of curvature of field.

Numerical data of the numerical examples 1 to 3 corresponding to the above-described first to third embodiments are set forth below. In the numerical data, "f" denotes the focal length, "Fno" denotes the F-number, "ω" denotes a semifield angle, "i" denotes the order as numbered from the object side, "Ri" denotes the radius of curvature of the i-th surface, "Di" denotes the axial space between the i-th surface and the (i+1)th surface, and "Ni" and "vi" respectively denote the refractive index and the Abbe number of the i-th material with respect to the d-line.

The shape of an aspheric surface is expressed by the following equation:

$$X = \frac{(1/R)h^2}{1+\sqrt{\{1-(1+k)(h/R)^2\}}} + Bh^4 + Ch^6 + Dh^8 + Eh^{10}$$

where a positive value is taken in the direction in which light travels, X is the amount of displacement from the vertex of a lens surface along the optical axis, h is the height from the optical axis in the direction perpendicular to the optical axis, R is the paraxial radius of curvature, k is the conic constant, and B to E are aspheric coefficients of 4th, 6th, 8th and 10th order.

In addition, the values of the factors in the above-mentioned conditions for the numerical examples 1 to 3 are provided in Table 1.

NUMERICAL EXAMPLE 1 f = 5.97–20.10   Fno = 2.88–5.50   2ω = 74.6–25.5

| | | | |
|---|---|---|---|
| R1 = 23.157 | D1 = 1.70 | N1 = 1.853000 | ν1 = 40.9 |
| *R2 = 10.478 | D2 = 2.31 | | |
| R3 = 62.965 | D3 = 1.00 | N2 = 1.882997 | ν2 = 40.8 |
| R4 = 8.497 | D4 = 2.64 | | |
| R5 = 13.300 | D5 = 2.50 | N3 = 1.846660 | ν3 = 23.9 |
| R6 = 52.650 | D6 = Variable | | |
| R7 = Stop | D7 = 0.80 | | |
| R8 = 8.233 | D8 = 2.60 | N4 = 1.516330 | ν4 = 64.1 |
| R9 = −49.857 | D9 = 0.43 | | |
| *R10 = 10.259 | D10 = 3.37 | N5 = 1.730770 | ν5 = 40.5 |
| R11 = −11.006 | D11 = 0.70 | N6 = 1.728250 | ν6 = 28.5 |
| R12 = 5.517 | D12 = Variable | | |
| R13 = 33.423 | D13 = 1.30 | N7 = 1.487490 | ν7 = 70.2 |
| R14 = −33.423 | D14 = Variable | | |
| R15 = 23.500 | D15 = 1.80 | N8 = 1.487490 | ν8 = 70.2 |
| R16 = −45.645 | D16 = 1.20 | | |
| R17 = ∞ | D17 = 1.50 | N9 = 1.516330 | ν9 = 64.1 |
| R18 = ∞ | | | |

Focal Length

| Variable Space | 5.97 | 12.90 | 20.10 |
|---|---|---|---|
| D6 | 24.09 | 7.62 | 2.56 |
| D12 | 4.40 | 4.27 | 4.12 |
| D14 | 5.85 | 13.99 | 22.39 |

Aspheric Coefficients

R2: k = −1.04742e+00   A = 0   B = 2.90470e−05   C = −9.00594e−07
D = −3.40817e−09   E = −3.22499e−11
R10: k = −1.03518e+00   A = 0   B = −1.15123e−04   C = −3.90010e−06
D = −9.83696e−08   E = −6.11202e−10

NUMERICAL EXAMPLE 2 f = 5.99–20.10   Fno = 2.88–5.50   2ω = 74.4–25.5

| | | | |
|---|---|---|---|
| R1 = 24.965 | D1 = 1.70 | N1 = 1.870000 | ν1 = 40.0 |
| *R2 = 10.628 | D2 = 2.32 | | |
| R3 = 57.663 | D3 = 1.00 | N2 = 1.882997 | ν2 = 40.8 |
| R4 = 8.590 | D4 = 2.63 | | |
| R5 = 13.491 | D5 = 2.50 | N3 = 1.846660 | ν3 = 23.9 |
| R6 = 57.555 | D6 = Variable | | |
| R7 = Stop | D7 = 0.80 | | |
| R8 = 7.853 | D8 = 2.50 | N4 = 1.516330 | ν4 = 64.1 |
| R9 = −55.428 | D9 = 0.62 | | |
| *R10 = 10.260 | D10 = 3.26 | N5 = 1.730770 | ν5 = 40.5 |
| R11 = −11.083 | D11 = 0.70 | N6 = 1.728250 | ν6 = 28.5 |
| R12 = 5.406 | D12 = Variable | | |
| R13 = 28.838 | D13 = 1.30 | N7 = 1.487490 | ν7 = 70.2 |
| R14 = −41.508 | D14 = Variable | | |
| R15 = 23.500 | D15 = 1.80 | N8 = 1.516330 | ν8 = 64.1 |
| R16 = −46.053 | D16 = 0.70 | | |
| R17 = ∞ | D17 = 1.50 | N9 = 1.516330 | ν9 = 64.1 |
| R18 = ∞ | | | |

Focal Length

| Variable Space | 5.99 | 13.28 | 20.10 |
|---|---|---|---|
| D6 | 24.49 | 7.19 | 2.55 |
| D12 | 4.76 | 3.78 | 4.00 |
| D14 | 5.92 | 14.71 | 22.31 |

Aspheric Coefficients

R2: k = −1.09983e+00   A = 0   B = 3.44778e−05   C = −1.09453e−06
D = −1.35822e−09   E = −5.58071e−11
R10: k = −1.29070e+00   A = 0   B = −1.22161e−04   C = −5.18865e−06
D = −1.20943e−07   E = −6.56441e−10

NUMERICAL EXAMPLE 3 f = 5.99–21.08   Fno = 2.88–5.50   2ω = 74.4–24.4

| | | | |
|---|---|---|---|
| R1 = 25.592 | D1 = 1.70 | N1 = 1.883000 | ν1 = 40.8 |
| *R2 = 10.914 | D2 = 2.32 | | |
| R3 = 48.244 | D3 = 1.00 | N2 = 1.882997 | ν2 = 40.8 |
| R4 = 8.638 | D4 = 2.68 | | |
| R5 = 13.529 | D5 = 2.50 | N3 = 1.846660 | ν3 = 23.9 |
| R6 = 53.851 | D6 = Variable | | |
| R7 = Stop | D7 = 0.80 | | |
| R8 = 7.868 | D8 = 2.50 | N4 = 1.516330 | ν4 = 64.1 |
| R9 = −57.136 | D9 = 0.53 | | |
| *R10 = 10.270 | D10 = 3.15 | N5 = 1.730770 | ν5 = 40.5 |
| R11 = −12.726 | D11 = 0.70 | N6 = 1.728250 | ν6 = 28.5 |
| R12 = 5.420 | D12 = Variable | | |
| R13 = 30.158 | D13 = 1.20 | N7 = 1.487490 | ν7 = 70.2 |
| R14 = −46.523 | D14 = Variable | | |
| R15 = 23.500 | D15 = 1.70 | N8 = 1.487490 | ν8 = 70.2 |
| R16 = −48.994 | D16 = 1.20 | | |
| R17 = ∞ | D17 = 1.50 | N9 = 1.516330 | ν9 = 64.2 |
| R18 = ∞ | | | |

Focal Length

| Variable Space | 5.99 | 13.69 | 21.08 |
|---|---|---|---|
| D6 | 27.08 | 7.86 | 2.84 |
| D12 | 5.57 | 4.23 | 4.09 |
| D14 | 5.85 | 15.37 | 23.71 |

Aspheric Coefficients

R2: k = −1.00708e+00   A = 0   B = 2.13351e−05   C = −1.12460e−06
D = 2.03412e−09   E = −3.80041e−11
R10: k = −1.20721e+00   A = 0   B = −1.18374e−04   C = −4.79729e−06
D = −1.09044e−07   E = −7.59094e−10

TABLE 1

| | Numerical Example | | |
|---|---|---|---|
| | 1 | 2 | 3 |
| Condition (1) | 1.87 | 1.88 | 1.88 |
| Condition (2) | 2.1 | 2.0 | 1.9 |
| Condition (3) | 70.2 | 71.2 | 72.2 |

TABLE 1-continued

| | Numerical Example | | |
|---|---|---|---|
| | 1 | 2 | 3 |
| Condition (4) | 0.00 | −0.18 | −0.21 |
| Condition (4) | −0.32 | −0.32 | −0.35 |

As described above, in the four-unit zoom lens of the negative, positive, positive and positive power arrangement according to the first to third embodiments, the lens configuration of each lens unit, the placement of an aspheric surface, the manner of moving each lens unit, etc., are optimized. Accordingly, a fast zoom lens having an angle of field of 70° or more at the wide-angle end, a zoom ratio of about 3 through 4 and high optical performance can be provided while attaining a short total lens length.

Figure 7:
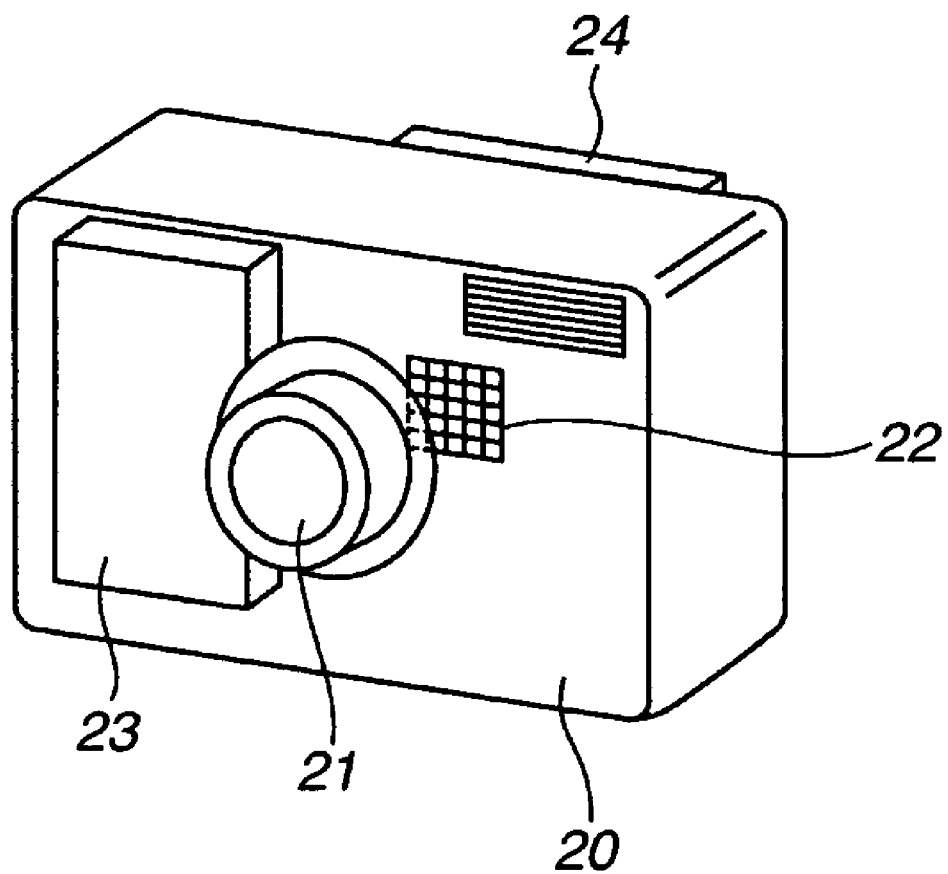
FIG. 7 is a perspective view schematically illustrating essential portions of a digital still camera.

FIG. 7 is a perspective view schematically illustrating an image capture apparatus in which the zoom lens according to the first to third embodiments is employed as a photographing optical system.

The image capture apparatus shown in FIG. 7 is a digital still camera. The digital still camera includes a camera body 20, a photographing optical system 21, a solid-state image sensor (photoelectric conversion device) 22, a memory 23, and a viewfinder 24. The photographing optical system 21 includes a zoom lens described in any one of the first to third embodiments. The solid-state image sensor 22 is incorporated in the camera body 20 and is configured to receive an object image formed by the photographing optical system 21. The solid-state image sensor 22 includes a CCD sensor, a CMOS sensor or the like. The memory 23 stores information corresponding to an object image photoelectrically converted by the solid-state image sensor 22. The viewfinder 24 includes a liquid crystal display panel or the like to allow the user to view an object image formed on the solid-state image sensor 22.

Applying a zoom lens system of the invention to an image capture apparatus, such as a video camera or a digital still camera, as described above, enables a small-sized image capture apparatus having high optical performance.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-139048 filed May 7, 2004, which is hereby incorporated by reference herein.

What is claimed is:

1. A zoom lens system comprising:
  lens units consisting of, in order from an object side to an image side:
    a first lens unit of negative optical power, the first lens unit consisting of, in order from the object side to the image side, a first lens element of negative optical power having an aspheric surface, a second lens element of negative optical power having a meniscus shape with a convex surface facing the object side, and a third lens element of positive optical power;
    a second lens unit of positive optical power, the second lens unit consisting of, in order from the object side to the image side, a fourth lens element of positive optical power, a fifth lens element of positive optical power, and a sixth lens element of negative optical power;
    a third lens unit of positive optical power, the third lens unit consisting of a seventh lens element of positive optical power; and
    a fourth lens unit of positive optical power, the fourth lens unit consisting of an eighth lens element of positive optical power,
  spaces between the first and second lens units, between the second and third lens units, and between the third and fourth lens units,
  wherein, during zooming from a wide-angle end to a telephoto end, the space between the first lens unit and the second lens unit decreases, the space between the second lens unit and the third lens unit varies, and the space between the third lens unit and the fourth lens unit increases, and
  wherein a refractive index of material of the first lens element (n11), a refractive index of material of the second lens element (n12), a focal length of the first lens element (f11), and a focal length of the second lens element (f12) satisfy the following conditions:

$1.85 < (n11+n12)/2 < 1.95$ $1.5 < f11/f12 < 2.5.$

2. A zoom lens system according to claim 1, wherein an Abbe number of material of the seventh lens element (vd3), a radius of curvature of a surface facing the object side of the seventh lens element (R31), and a radius of curvature of a surface facing the image side of the seventh lens element (R32) satisfy the following conditions:

$66 < vd3 < 78$ $-0.4 < (R31+R32)/(R31-R32) < 0.2.$

3. A zoom lens system according to claim 1, wherein a radius of curvature of a surface facing the object side of the eighth lens element (R41), and a radius of curvature of a surface facing the image side of the eighth lens element (R42) satisfy the following condition:

$-0.6 < (R41+R42)/(R41-R42) < 0.$

4. A zoom lens system according to claim 1, wherein the fifth lens element and the sixth lens element constitute a cemented lens, and the fifth lens element has an aspheric surface facing the object side.

5. A zoom lens system according to claim 1, wherein the first lens element has a meniscus shape with a convex surface facing the object side, and the third lens element has a meniscus shape with a convex surface facing the object side.

6. A zoom lens system according to claim 1, wherein the third lens unit is movable to focus.

7. A zoom lens system according to claim 1, wherein the zoom lens system forms an image on a photoelectric conversion device.

8. An image capture apparatus comprising:
  the zoom lens system according to claim 1; and
  a photoelectric conversion device configured to receive an image formed by the zoom lens system.

* * * * *